United States Patent
Leah et al.

(10) Patent No.: US 11,367,888 B2
(45) Date of Patent: Jun. 21, 2022

(54) ANODE FOR A SOLID OXIDE FUEL CELL AND COMPOSITION AND METHOD FOR FORMING SAME

(71) Applicant: Ceres Intellectual Property Company Limited, Horsham (GB)

(72) Inventors: Robert Leah, Horsham (GB); Eva-Maria Hammer, Horsham (GB); Adam Bone, Horsham (GB)

(73) Assignee: Ceres Intellectual Property Company Limited, Horsham (GB)

( * ) Notice: Subject to any disclaimer, the term of this patent is extended or adjusted under 35 U.S.C. 154(b) by 57 days.

(21) Appl. No.: 16/467,926

(22) PCT Filed: Dec. 7, 2017

(86) PCT No.: PCT/GB2017/053681
§ 371 (c)(1),
(2) Date: Jun. 7, 2019

(87) PCT Pub. No.: WO2018/104736
PCT Pub. Date: Jun. 14, 2018

(65) Prior Publication Data
US 2020/0075979 A1 Mar. 5, 2020

(30) Foreign Application Priority Data
Dec. 8, 2016 (GB) .................................... 1620848

(51) Int. Cl.
*H01M 8/0637* (2016.01)
*H01M 4/86* (2006.01)
(Continued)

(52) U.S. Cl.
CPC ....... *H01M 8/0637* (2013.01); *H01M 4/8621* (2013.01); *H01M 4/8647* (2013.01);
(Continued)

(58) Field of Classification Search
CPC ............. H01M 8/0637; H01M 4/8621; H01M 4/8647; H01M 4/8846; H01M 4/9075
See application file for complete search history.

(56) References Cited

U.S. PATENT DOCUMENTS 5,908,713 A   6/1999   Ruka et al.
6,793,711 B1  9/2004   Sammells
(Continued)

FOREIGN PATENT DOCUMENTS

CN   101733089 A   6/2010
EP   0996184       4/2000
(Continued)

OTHER PUBLICATIONS

International Search Report and Written Opinion dated Mar. 15, 2018 in Application No. PCT/GB2017/053681.
(Continued)

*Primary Examiner* — Jimmy Vo
(74) *Attorney, Agent, or Firm* — Snell & Wilmer L.L.P.

(57) ABSTRACT

The invention relates to solid oxide fuel cell anodes, in particular anodes which containing porous particles coated with catalytic nickel. The use of porous particles as a carrier for the nickel catalyst helps to overcome some of the redox stability issues experienced by some systems and improves the internal reforming properties of the system and permits less nickel to be used in SOFC systems.

23 Claims, 6 Drawing Sheets

(51) Int. Cl.
  *H01M 4/88* (2006.01)
  *H01M 4/90* (2006.01)
  *H01M 8/12* (2016.01)

(52) U.S. Cl.
  CPC ....... *H01M 4/8846* (2013.01); *H01M 4/9075* (2013.01); *H01M 2004/8684* (2013.01); *H01M 2008/1293* (2013.01)

(56) References Cited

U.S. PATENT DOCUMENTS

| | | | |
|---|---|---|---|
| 2007/0015015 A1 | 1/2007 | Hoshino et al. | |
| 2007/0161506 A1* | 7/2007 | Saito | B01D 53/945 502/302 |
| 2009/0061284 A1* | 3/2009 | Blennow | C04B 35/488 429/466 |
| 2011/0039183 A1 | 2/2011 | Armstrong et al. | |
| 2014/0045099 A1* | 2/2014 | Hwang | H01M 8/1226 429/534 |
| 2014/0162149 A1* | 6/2014 | Niimi | H01M 4/8652 429/405 |

FOREIGN PATENT DOCUMENTS

| | | |
|---|---|---|
| EP | 1939967 | 7/2008 |
| EP | 1979078 | 10/2008 |
| EP | 2784863 | 10/2014 |
| JP | 2007115536 A | 5/2007 |
| JP | 2010282932 A | 12/2010 |
| WO | 2009014645 | 1/2009 |

OTHER PUBLICATIONS

International Preliminary Report on Patentability dated Jun. 11, 2019 in Application No. PCT/GB2017/053681.
European Search Report dated Apr. 8, 2020 in Application No. 17817044.
Office Action dated Mar. 30, 2020 in Russian Patent Application No. 2019120050.
First Office Action dated Dec. 28, 2021 in counterpart Chinese Application No. 201780076369.2.
Search Report dated Jun. 16, 2017 in counterpart Great Britain Application No. GB1620848.0.

* cited by examiner

ANODE FOR A SOLID OXIDE FUEL CELL AND COMPOSITION AND METHOD FOR FORMING SAME

FIELD OF INVENTION

The invention relates to solid oxide fuel cell electrodes, in particular solid oxide fuel cell anodes, compositions used in the manufacture of said anodes, methods of making said anodes, electrocatalysts used in said anodes and uses of said electrocatalysts in solid oxide fuel cell anodes.

BACKGROUND TO THE INVENTION

Solid oxide fuel cells (SOFCs) offer an efficient means of generating electricity from fuel gases. SOFCs consist of an anode and a cathode separated by a solid electrolyte material. Fuel gas and air are passed over the anode and cathode respectively at high temperatures to produce electricity. Various fuel cell architectures exists. A particularly preferred SOFC design is metal supported solid oxide fuel cells, such as those disclosed GB1476647.

The anodes used in SOFCs typically comprise conducting ceramic materials such as a cermet, often containing nickel. It is also important that the anode has sufficient porosity to allow fuel to communicate with the electrolyte, where it can combine with oxygen ions migrating from the cathode side.

Conventional SOFC cermet anodes consist of a porous mixture of an electronically conductive metallic phase (usually nickel or a nickel alloy) and a ceramic phase usually made of electrolyte material. Suitable metals with high electrocatalytic activity and low cost (i.e. not precious metals) are usually transition metals (Ni, Fe, Cu, Co) which under SOFC operating temperatures will be reduced and oxidised based on the fuel and air supply to the cell. This repeated oxidation and reduction is often destructive due to the change in volume associated with it, and the fact that upon reduction the metal oxide frequently does not return to its original shape. Some systems use copper oxide which is used as a sintering aid to improve the cell's tolerance to this process. This is the case with cells possessing an architecture based on the Ceres Power Steel Cell design (see for example WO 02/34628 A1).

There is however a concern that due to microstructural changes in the anode during operation (notably the gradual loss of necks between metal particles due to surface diffusion), REDOX stability is gradually lost during operation, resulting in eventual failure. In addition it is known that accidentally operating a cell with insufficient fuel will almost always lead to a catastrophic failure due to delamination of the anode/electrolyte assembly (it is not quite clear if the delamination happens at the anode/electrolyte interface or in the anode itself). A more robust ceramic backbone structure is therefore desirable. Reducing the Ni content in anodes can provide lower degradation rates upon REDOX cycling, but at the same time the cell performance drops significantly.

Ideally, a long term stable anode would have the main structural phase of the anode as porous ceramic unaffected by changes in anode atmosphere, with a much lower fraction of the anode occupied by metal. Such designs are typically achieved by sintering a ceramic backbone structure with no metallic phase and then adding the metal afterwards by infiltration of metal salt solutions followed by drying and calcination.

Unfortunately, these structures are impractical to make in volume as typically multiple infiltrations are required to load enough metal into the structure. In addition, they can be unstable due to rapid sintering of the nanoscale metal particles leading to loss of conductivity.

EP 0 996 184 A2 is an example of high performance solid oxide fuel cell anode which is manufactured by impregnating nickel into the porous microstructure of an anode. The anode comprises nickel as well as agents adapted to resist coarsening of the nickel metal to ensure it retains a high surface area.

GB 1,186,493 discloses electrodes that have been made using a variety of different materials for solid electrolyte fuel cells. This includes using mixed oxide layers containing praseodymium oxide, nickel oxide and chromium oxide. It is also chiefly directed towards cathodes.

U.S. Pat. No. 6,319,626 describes a high performance electrocatalyst based on transition metal perovskites of, among other elements, praseodymium which are reacted with yttrium-stabilised zirconia.

US 2015/0244001 discloses a method of manufacturing cathodes involving CGO particles coated with praseodymium.

Accordingly, what is required is an anode having excellent conductive properties, which catalyses the reactions within the cell and wherein the anode does not undergo a significant volume change through redox cycling. It would also be desirable to reduce the amount of nickel used to improve the effective lifetime of the cell, but in such a way that does not compromise on the conductivity of the anode.

The major drawbacks of this conventional anode structure are:
(1) There is a tendency for the metallic phase to reoxidise (with an associated volume expansion) if the supply of fuel is stopped when the cell is at operating temperature. This can disrupt the structure of the anode causing the cell to fail although, as disclosed in GB1315744.1 and GB1315746.6 (incorporated herein by reference), it is possible to make an anode microstructure which is sufficiently tolerant to this to allow the fuel supply to be cut hundreds of times before serious cell damage occurs; and
(2) There is relatively low internal surface area resulting in low catalytic activity.

The invention is intended to overcome or at least ameliorate these problems.

SUMMARY OF THE INVENTION

There is provided in a first aspect of the invention, an anode for a solid oxide fuel cell (SOFC), the anode comprising: a matrix comprising a doped metal oxide; and an electrocatalyst, wherein the electrocatalyst comprises a porous particle containing a steam reformation catalyst material.

The inventors have surprisingly found that by introducing a steam reformation catalyst material into the anode material via a porous particle, this improves the efficiency of the SOFC and allows equivalent or greater cell performance to be achieved using a lower steam reformation catalyst material content. As explained above, it is difficult to introduce a continuous and high degree of porosity throughout the entire anode structure and then impregnate catalytic materials into the porous matrix. However, by introducing porous particles (typically with higher porosity than that the anode material itself) it is possible to engineer greater porosity in an industrially reproducible way. Without being bound by theory, it is believed that by "entrapping" the steam reformation catalyst material within the porous particles, this helps to reduce the strain applied by the steam reformation catalyst material though continuous redox cycling as the porous particle resists deformation as the steam reformation catalyst material undergoes structural changes.

The steam reformation catalyst material is not particular limited to any one substance. However, typically the steam reformation catalyst material comprises a metal, most typically comprising an element selected from the group consisting of: Mn, Fe, Co, Cu, Ru, Ni, Rh, Pt, Pd, Au or a combination thereof. The steam reformation catalyst material is most typically metallic and/or an alloy of different metals typically including at least one of those listed herein. It is often the case that the steam reformation catalyst material is selected from the group consisting of: Fe, Co, Ru, Ni, Rh, Pt, Pd or a combination thereof as these have good catalytic activity. Of these compounds, Fe, Co, Ni and combinations thereof are particularly preferred as they show good catalytic properties in steam reformation, are readily available and can be introduced into the porous "carrier" particles using simple techniques. Often, the steam reformation catalyst comprises nickel as this has been shown to have optimal catalytic properties in steam reformation processes.

The steam reformation catalyst may also comprise Mg (magnesium) and/or Al (aluminium). These elements have been found to improve the stability of the catalytic metal dispersion.

The steam reformation catalyst material is trapped within the pores of the catalyst particles, meaning that the volume change associated with reduction and oxidation does not result in a change in the overall anode microstructure. The impregnated catalyst particles have a high specific surface area (typically higher than conventional porous anodes) leading to higher catalytic activity, particularly for steam reforming of methane.

The term "matrix" as used herein is intended to refer to that portion of the anode which supports the porous particles. Although the matrix comprises doped metal oxide, it may comprise other ingredients and may form either a homogeneous or heterogeneous layer of material. Other anode components may be distributed throughout this matrix (uniformly or irregularly) and/or said components may be carried on part or all of the surface or surfaces of the matrix.

Typically, the doped metal oxide is an electrically conducting ceramic material as such materials are well suited to the operational conditions of solid oxide fuel cells. Typically, the electrically conducting ceramic material is a rare-earth doped ceria. Such materials are not only stable under SOFC operating conditions, but also offer good electrical and structural properties and can be affixed well to substrates, especially metal substrates. Further, it is often the case that the rare-earth doped ceria is selected from: gadolinium doped ceria; samarium doped ceria; or a combination thereof. In particular, the rare-earth doped ceria is gadolinium doped ceria (CGO).

For the avoidance of doubt, reference to "metals" or specific metals such as, for instance, "nickel" as used herein is intended to cover any compound or alloy which comprises said metal (e.g. nickel oxide) including the elemental metal itself, unless specified to the contrary. The steam reformation catalyst material coating applied to the internal surface of the porous particles may include one or more catalytic materials, and or other additives to improve the properties of the steam reformation catalyst. For example, cobalt-nickel alloys may be used or simple mixtures of cobalt and nickel.

The porous particles have pore sizes of less than 1 μm and usually greater than 1 nm. Typically, the porous particles have pore sizes in the range 1 nm to 500 nm. Usually, the porous particles are mesoporous particles. Typically, the pore size is in the range 1 nm to 200 nm, more typically 1 to 100 nm, more typically still 1 nm to 80 nm and even more typically still 1 to 50 nm. The term, "mesoporous" as used herein is intended to mean a pore size in the range 2 nm to 50 nm. Pores sizes are often in the range of 5 to 30 nm and may be in the range of 10 nm to 20 nm.

By introducing a steam reformation catalyst material into porous particles, rather than directly introducing a steam reformation catalyst material into the anode matrix, performance can be improved and/or comparable performance can be achieved using less steam reformation catalyst material. The smaller the pore size, typically the greater the surface area and hence greater active surface for the steam reformation catalyst. An additional benefit of this approach is that a wide variety of porous particles exist that are stable under SOFC operating conditions and hence, particle composition is not restricted in the same way as the bulk material (typically the matrix supporting the particles). However, the particles are typically electronically and/or ionically conductive under anode conditions. The particles are also capable of being incorporated into printing compositions which avoids the need to modify current industrial processing techniques.

It is often the case that the porous particles are dispersed throughout the matrix. Typically, the distribution is substantially homogenous as it is often preferred to print the anode materials in one step (rather than build a multilayer anode). That said, the distribution need not be uniform and the particles may form a coating on the surface or surfaces of the anode.

There is no particular restriction on the types of particles that can be used in the present invention, provided that the porous particles are robust enough to withstand SOFC operating conditions and do not, or at least substantially resist, deformation such that they are capable of maintaining their porous structure through repeated operational cycles of an SOFC. Typically, the porous particles are a cermet as this improves compatibility with the matrix material and offers useful electrical and thermal properties. It is often the case that porous particle are made from a different material to the matrix. A mixture of different materials may be used to fabricate the catalyst support particles and more than one type of catalyst support particle may be used.

Of those materials, it is often the case that the porous particles comprise praseodymium doped ceria (PDC). PDC is commonly used in the automotive industry in removal of $NO_x$ gases in combination with other catalysts. PDC has been found to possess an optimal combination of properties that make it well suited for use with SOFCs. It has surprisingly been found that, where an SOFC comprising the anode of the invention is used (particularly those employing PDC), the SOFC is still able to retain much of its activity even after suffering significant damage (such as delamination—often caused in situations wherein SOFC operation is abruptly halted).

It has also been found that when porous particles containing a steam reformation catalyst are used in conjunction with SOFC anodes, higher internal reforming rates are observed. This results in a greater availability of hydrogen at any given fuel utilisation, which in turn reduces stress on the cells, allowing lower degradation and/or operation at higher fuel utilisation without risking localised fuel starvation. Without being bound by theory, it is believed that the higher internal reforming capability of the cells can be explained by a significant increase in active surface area.

Although the preferred steam reformation catalyst provided in SOFC anodes (e.g. in one preferred embodiment being nickel) undergoes frequent oxidation and reduction (between the oxide and metal forms respectively), it is typically the case that the electrocatalyst comprises a porous particle (as described above) containing an oxide of the steam reformation catalyst material (e.g. nickel oxide). This is especially true during the initial fabrication process.

The steam reformation catalyst material introduced into the porous particles (e.g. nickel of one form or another) is typically introduced into the porous particle as a solubilised salt, most typically a metal salt (where the steam reformation catalyst material is a metal). This is added to the porous particles and then dried (and typically calcined to decompose the metal salt to the metal oxide) in order to coat the porous particles with the steam reformation catalyst and any other additives. The person skilled in the art would be familiar with such infiltration methods and multiple applications may be conducted to ensure substantially complete coating of the internal structure of the porous particles.

It is typically the case that incipient wetness impregnation techniques are used to incorporate the catalytically active materials into the porous particles described above. However, other techniques known in the art for impregnation of catalyst supports may be used. For instance, with metallic catalysts, techniques such as ion-exchange could in principle be used.

The matrix may further comprise one or more components selected from: sintering aids, conductors, catalyst materials, binders, dispersants, or combinations thereof. Some of these materials are removed during the sintering process (such as the binders and the dispersants) but provide useful functionality to the composition from which the matrix is formed.

For instance, the matrix may further comprise "free" steam reformation catalyst material as described above only not bound to porous particles. For example, nickel compounds such as nickel oxide or metallic nickel may be added directly to the matrix in addition to that already introduced into the porous particles. As explained above, the steam reformation catalyst material is typically in the form of an oxide, such as nickel oxide. Many metallic steam reformation catalysts also improve the conductive properties of the matrix (as most are metallic) as well as promoting the internal reformation of fuel. Therefore, it can be desirable to introduce some steam reformation catalyst material into the matrix to boost conductivity. The amount of steam reformation catalyst material (or oxide thereof) used is not particularly limited. However, in order to achieve the best balance of properties, it is typically the case that the steam reformation catalyst material content of the matrix is equal to or less than about 80% wt., more typically equal to or less than about 75%, more typically still in the range of 5%-70% wt., even more typically in the range 10%-60% wt., even more typically still in the range 20%-55% wt. of the total anode. Usually, the steam reformation catalyst material content will be in the range 10%-50% wt., more often 15%-45%, more typically 20%-40% and in some instances in the range 25%-35%.

Alternatively, or in addition to the steam reformation catalyst added to the matrix material, the matrix may further compromise other conductors (metallic or non-metallic) to improve the conductance of the anode. This includes non-catalytic materials. For instance, copper alloys may be introduced into the composition. It is important to note that a number of other catalyst materials (such as precious metals or other catalytically active transition metals could be used to catalyse other reactions within the fuel cell (e.g. promoting the breakdown of undesirable by-products) and/or augment the properties of the steam reformation catalyst material). Most typically, any additional conductors will be ceramic conductors as these tend to be more redox stable and they react to the SOFC conditions in a similar way to the anode material. This can also have additional benefits as some ceramic conductors are known to provide some electrocatalytic activity themselves. There is no particular restriction on the amount or choice of said conductors provided that they do not unduly compromise the activity or stability of the anode or SOFC. Making use of "non-steam reformation catalyst material" conductors to compensate for the overall reduction in steam reformation catalyst material allows more redox-stable conductors to be used and minimises the mechanical strain placed on the cell during redox cycling.

Other materials such as molybdenum, magnesium, aluminium and oxides thereof may in principle be added in addition to the steam reformation catalyst material to improve the stability and resistance to carbon formation or poisoning of the catalyst.

A variety of other additives may be included within the matrix material. For instance, the matrix may further comprising sintering aids to ensure that an optimal structure is achieved within the anode on firing. As an example, the composition may comprise copper, typically copper oxide. Reference to "copper" herein is intended to refer to those compounds or alloys that comprise copper, including copper metal, unless otherwise stated.

As can be seen from the examples provided below, although introducing porous particles containing steam reformation catalyst material (such as nickel) into SOFC anodes leads to an improvement in performance, adding too much can have deleterious effect of the redox stability of the anodes. Accordingly, it is typically the case that only a certain amount of the anode matrix material is replaced with porous particles containing steam reformation catalyst material. Typically, the levels of porous particles containing steam reformation catalyst material will be equal to or less than 90% wt., more typically equal to or less than 80% wt., more typically still equal to or less than 75% wt., even more typically in the range 5-70% wt. and even more typically still in the range 10-60% wt. of the total anode. It may be the case that the porous particles containing steam reformation catalyst material are present in an amount in the range 15-50% wt., more often in the range of 20-40% wt. and even more typically in the range of 25-30% wt. of the total anode.

It is typically the case that the anode is for a metal supported solid oxide fuel cell. Typically the metal substrate is steel and more typically ferritic stainless steel. One examples of a suitable SOFC with which the invention is compatible is that of the Ceres Power "Steel Cell" as described, for instance, in WO 02/35628 A1 (in particular the specific embodiments disclosed on pages 8 to 13 and the accompanying figures).

There is provided in a second aspect of the invention, a composition for making the anode according to the first aspect of the invention, the composition comprising: a matrix precursor comprising a doped metal oxide; and an electrocatalyst, wherein the electrocatalyst comprises a porous particles containing steam reformation catalyst material.

The term, "matrix precursor" is intended to describe the collection of ingredients that make up the composition used ultimately to make the matrix described above. Once cured, the resulting matrix is that which is described in the first aspect of the invention. The main additional component which distinguishes the matrix precursor form the matrix is the presence of a solvent to allow the composition to be effectively printed.

By utilising porous particles as a carrier for the steam reformation catalyst and by incorporating said particles into a composition, anodes having improved porosity and properties as described above can be manufactured from said composition. The skilled person would understand how to manufacture a solid oxide fuel cells, for example using printing techniques as such practices are well known in the art. In short, an ink is deposited on a suitable substrate and the solvent from the ink is evaporated to leave behind a coating which, usually after one or more sintering steps, acts as the conducting ceramic anode.

The composition may comprise a variety of additives to improve the properties of the composition to better facilitate anode manufacture. For instance, dispersants may be added to prevent agglomeration of materials within the composition during storage, transport and manufacture. Compounds to modify the rheology of the composition may be added to improve the flow of the composition. Solvents to improve the solubility of components prior to treatment, and other materials could be added as would be well familiar to the person skilled in the art.

Additives that may be used in conjunction with the invention include, but are not limited to: pigments (such as metal oxide pigments), polymeric binders, dispersing agents to prevent agglomeration and stabilise the metal oxide powders, wetting agents/defoaming agents to destabilise any bubbles within the composition and assist in levelling out the printed layer into a substantially flat surface.

The composition may further comprise one or more solvents. This is especially useful when printing electrode layers as it allows the various components to be combined in a substantially homogeneous manner and the solvent can be removed by drying slurries to form electrode materials (typically anodes). Often, the composition is provided in the form of an ink.

The solvent used in the slurries/inks may be selected from a wide range of solvents suitable for making screen print inks with inorganic pigments, but will often be a solvent with low volatility (so the ink does not dry prior to deposition), limited polarity and good compatibility with the polymers required to give the ink the necessary rheological properties. Suitable solvents include, but are not limited to Texanol (2,2,4-trimethyl 1,3-pentanediol monoisobutyrate), terpineol, butyl carbitol, water and combinations thereof. Of these, water is least preferred as dispersal of the metal oxide powders is difficult due to hydrogen bond formation between the water and the hydroxide groups on the particle surfaces, causing particle agglomeration.

The slurry may then, in some examples, be milled, typically by attrition milling, to reduce the doped-ceria powder particle size, and the particle size of any sintering aid present. This may be done before or after incorporation of the electrocatalyst depending on the size and effect on activity of the electrocatalyst particles. Optionally, milling may also provide a bimodal particle size distribution, with a dominant peak at around 0.15 µm, often in the range 0.1-0.4 µm or 0.15-0.35 µm; and a secondary peak at around 1.0 µm, often in the range 0.5-1.5 µm or 0.75-1.25 µm (as measured using a Malvern mastersizer powder dispersed in Texanol). The milling process also has the benefit of homogeneously dispersing any sintering aid present with the doped-ceria powder. Where present, the sintering aid will often be reduced in particle size to sub-micron level, for instance in the range 0.1-0.9 µm, often 0.3-0.6 µm.

An additional step of milling the slurry, optionally to produce a bimodal particle size distribution, is therefore envisaged. Suitable milling processes include, but are not limited to bead milling, vibro-milling, basket milling and combinations thereof. These all involve adding very hard ceramic beads to the slurry, and applying mechanical energy such that the beads continuously collide with each other, breaking down the powder as it is caught between colliding beads. Where beads are present, there may be a step of removing the beads from the slurry after milling is complete.

Optionally, organic polymers may be added to the slurry, often after milling, to convert it into a screen-printable ink. Organic polymers typically used include binders (often in the range 1-5 wt %), dispersing agents (if not added at the milling stage), surfactants (often in the range 0.05-5 wt %) to aid levelling of the print and release air bubbles from the ink during manufacture and printing, and combinations of these. The binder serves the dual role of modifying the rheology of the ink to increase its thixotropic nature, which is important for effective printing, and binding the particles together in the printed layer as it dries, preventing cracking and giving the dried green powder compact some strength. Suitable binders include, but are not limited to polyvinylbutyral (PVB) and ethyl cellulose. Suitable dispersing agents and surfactants are generally proprietary additives, supplied by companies such as Byk-Chemie, BASF, TEGO or Schwegmann. Ink formation will often require dissolution of the additives. This could be through the use of a suitable high shear dispersion mixing process such as a High Speed Disperser (HSD), although other methods may be used. The ink may be further homogenised using a triple-roll mill. The formation of an ink provides for easier deposition of the doped-ceria onto the substrate.

There is provided in a third aspect of the invention, a method of making the anode according to the first aspect of the invention. The method comprising the steps of: i) applying a composition according to the second aspect of the invention to a substrate; and ii) curing the composition materials. Typically, the composition is print onto a substrate. This is advantageous as printing is very industrially scalable and permits large numbers of cells to be fabricated in a continuous manner.

The temperatures, pressures and the surrounding environmental conditions required to effectively sinter a given composition would be well known to one of skill in the art. Typically inert or substantially inert atmospheres are used to perform sintering, often at standard pressure.

There is also provided in a fourth aspect of the invention, a solid oxide fuel cell comprising the anode according to the first aspect of the invention. Typically, the solid oxide fuel cell is a metal supported solid oxide fuel cell. Specifically, the anode may be provided on a substrate (in particular a metal substrate) together with an electrolyte layer and a cathode layer. The substrate may be porous to permit air fuel to contact the anode through the metal support substrate.

The substrate metal may be any metal substrate commonly used in metal-supported SOFCs, however, for this invention the metal substrate will often comprise a perforated region surrounded by a non-perforated region as described in GB 2,368,450, the disclosure thereof, in particular in relation to the fundamental construction of metal supported SOFC's of this type, is incorporated herein by reference. In these designs, the anode is positioned over the perforated region, this configuration providing for gas access to the anode through the perforated (often laser drilled) region. Often the metal substrate will be a stainless steel substrate, often ferritic stainless steel as ferritic stainless steel has a similar thermal expansion co-efficient to gadolinium doped ceria (often abbreviated to GDC or CGO), the most commonly used doped-ceria; thereby reducing stresses within the half-cell during heating/cooling cycles.

Also provided in a further aspect of the invention is a solid oxide fuel cell stack comprising the fuel cells according to the fourth aspect of the invention. It is typically the case that multiple fuel cells are arranged into banks of individual cells typically referred to as stacks as would be well familiar to a person skilled in the art.

In a further aspect of the invention, there is provided a method of generating electricity using the SOFC or SOFC stack described herein.

In another aspect of the invention, there is provided an electrocatalyst for a solid oxide fuel cell comprising a nickel containing porous particle, the porous particle comprising rare-earth doped ceria.

The inventors have found that utilising porous particles of rare-earth doped ceria is an excellent way to improve the catalytic properties of SOFCs. Existing SOFCs systems make use of bulk rare-earth doped ceria layers which have been impregnated with catalyst material. Such systems suffer from the draw backs outlined above. Accordingly, by replacing the simple SOFC catalysts materials with nickel containing porous particles of rare-earth doped ceria, it is possible to improve the catalytic activity and/or reduce the amount of catalyst material required to achieve the same level of efficiency. Said catalyst materials also can help to resist redox damage due to their porous structure.

There is also provided in another aspect of the invention, the use of an electrocatalyst comprising a porous particle containing nickel in an SOFC anode. As mentioned, above in relation (for instance) to the first aspect of the invention, although porous particles laden with catalytic materials are known in certain technical fields (such as in the field of automotive exhaust catalysis), there has been no adoption of such approaches in the field of SOFCs until now. This is perhaps due to the demanding redox requirements and environments that SOFCs must tolerate. This may be because SOFCs already known in the art have a porous structure (to permit the proliferation of fuel and oxygen ions which can combine to create electricity). Accordingly, in this aspect of the invention, the porous particle is typically as defined in the first aspect of the invention.

The invention will now be described with reference to the accompanying figures and drawings.

DETAILED DESCRIPTION

Figure 1:
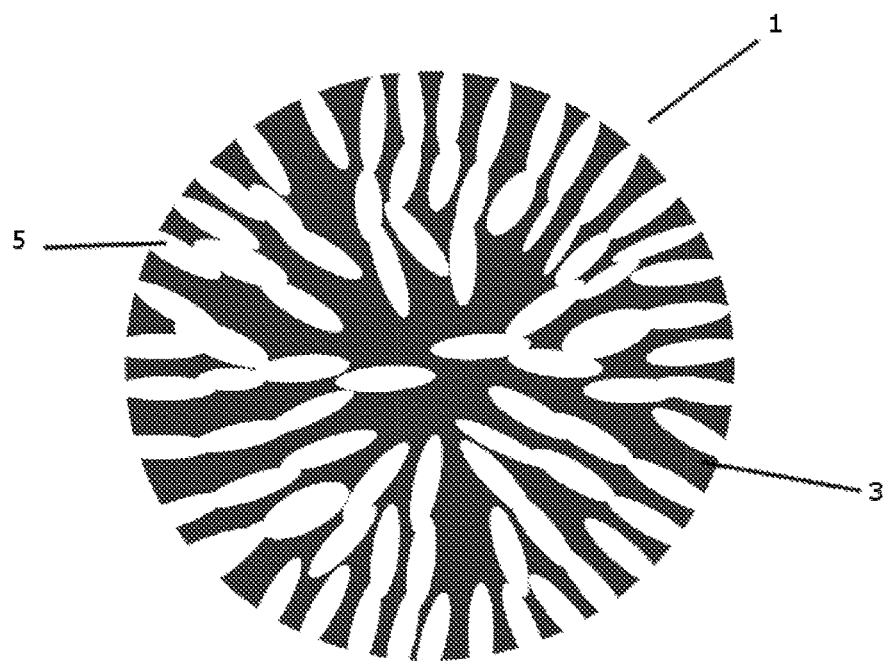
FIG. 1 shoes a schematic diagram of a PDC particles prior to the addition of a catalytic coating.
Figure 2:
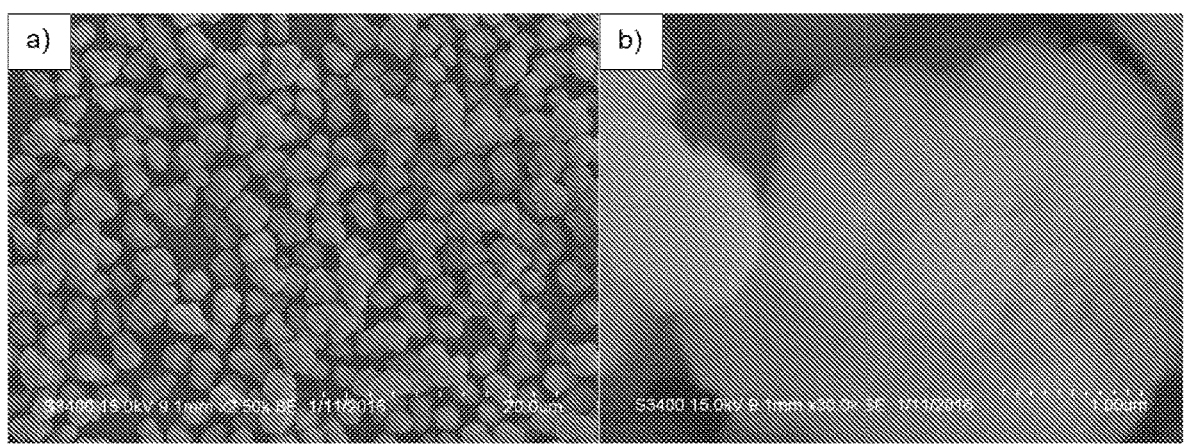
FIG. 2 shows an SEM micrograph of PDC catalyst support particle at a0 2500× magnification and b) 30000× magnification.

The embodiments described herein use 20% praseodymia-doped ceria (PDC, $Ce_{0.8}Pr_{0.2}O_{1.9}$) supplied commercially by Solvay and which is typically used as a support for water gas shift catalysts in the automotive industry to reduce $NO_x$ emissions. PDC is obtained in the form of porous, approximately spherical particles of approximately 3 μm diameter, and they have a very high internal surface area of 150-200 $m^2g^{-1}$; the spherical particles being made up of agglomerates of nanometre-scale crystallites. A schematic representation of the spherical porous PDC particle 1 is shown in FIG. 1 comprising a particle body 3 and a plurality of pores 5.

Figure 3:
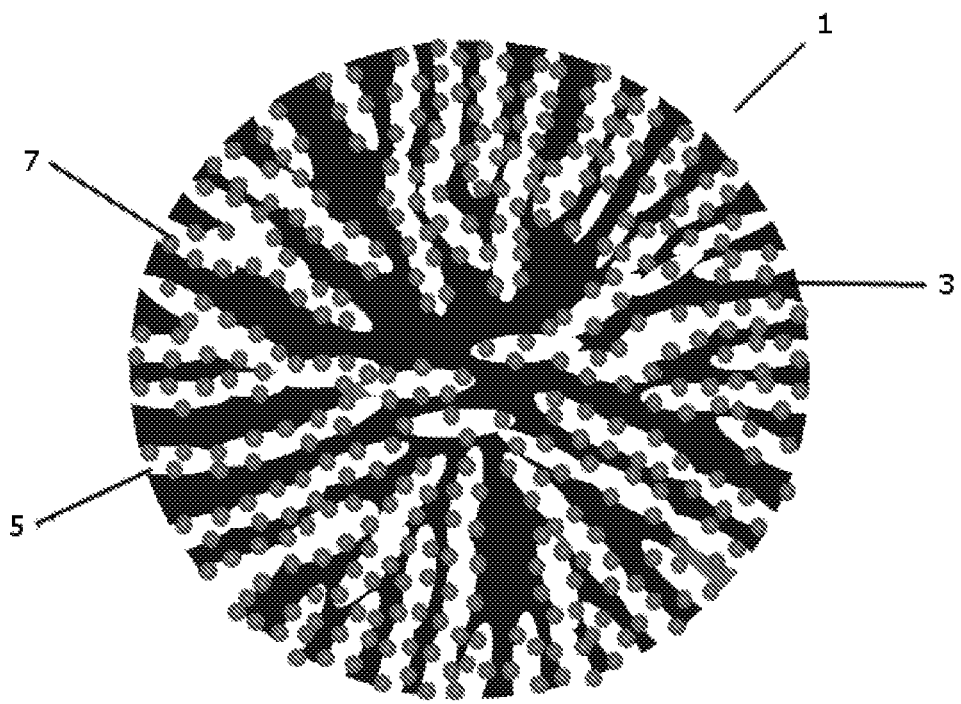
FIG. 3 shows a schematic diagram of the PDC particles following impregnation with catalyst material.
Figure 4:
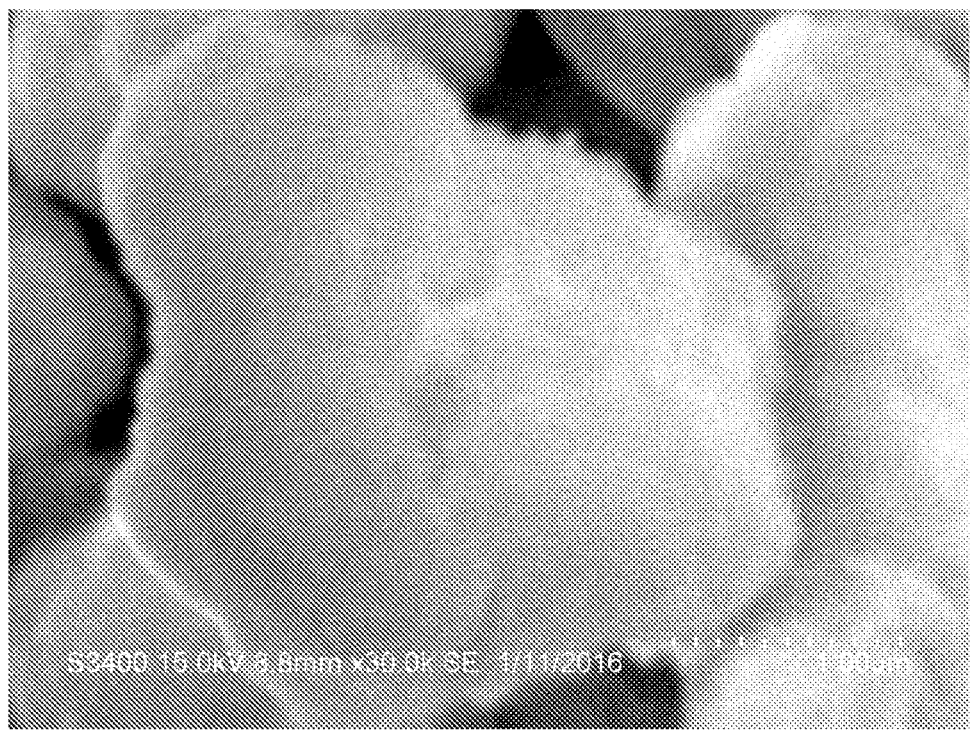
FIG. 4 shows an SEM micrograph of the PDC particles after impregnation at 30000× magnification.

The PDC particles are impregnated with a suitable metallic catalyst in order to line the pores of the PDC particles with active metal. In all embodiments described here the active metal catalyst is nickel or an alloy thereof. Nickel is known to be catalytically active for the dissociation of molecular hydrogen (which is an important step in the electrochemical oxidation of hydrogen in an SOFC anode), and the steam reforming of methane to release hydrogen and carbon monoxide (another important SOFC anode reaction). A catalyst particle impregnated with metal catalyst nanoparticles is shown schematically in FIG. 3 containing a particle 1 comprising pores 5 and a particle body 3, wherein the surface of the pores are coated with a plurality of catalyst nanoparticles 7. An SEM micrograph of an impregnated particle is shown in FIG. 4 in which the nanoparticles are too small to be seen individually.

The process of incipient wetness impregnation involves the following steps:

(a) Establishing empirically the specific pore volume (expressed as $cm^3/g$) of the catalyst support, by adding deionised water to a known mass of catalyst support dropwise until the catalyst starts to appear slightly damp (the point of incipient wetness). This is the volume of water the pores in the catalyst can absorb without leaving excess water outside the catalyst particles.

(b) Making up a solution of the nitrate salts (though other salts, e.g. chlorides, could be used in principle) of the active metal(s) to be impregnated in deionised water. In this case a saturated solution of nickel and optionally cobalt nitrates are prepared, to maximise the amount of metal which could be impregnated onto the catalyst support in a single step.

(c) Adding the solution of metal nitrates drop-wise to a known mass of PDC catalyst support particles whilst continuously mixing the catalyst support until a volume of solution just below that previously determined to be the point of incipient wetness has been added.

(d) Transferring the catalyst support impregnated with nitrate solution to an oven, and drying off the water to leave the catalyst impregnated with anhydrous metal nitrate coating the inside of its pores.

(e) Transferring the dried impregnated catalyst to a suitably ventilated furnace, and calcining it at a temperature (650° C. was used for in all cases here) high enough to cause the metal nitrates to decompose to the equivalent metal oxides, with the emission of nitrogen dioxide.

Subsequent manufacturing processes to incorporate the impregnated PDC particles into a fuel cell system are performed with the impregnated catalyst in its oxide form. On exposure to hydrogen and temperature when the SOFC is first operated, the metal oxides are reduced to their native metal form, in which they provide catalytic activity.

Comparison with a Conventional SOFC Anode

Figure 5:
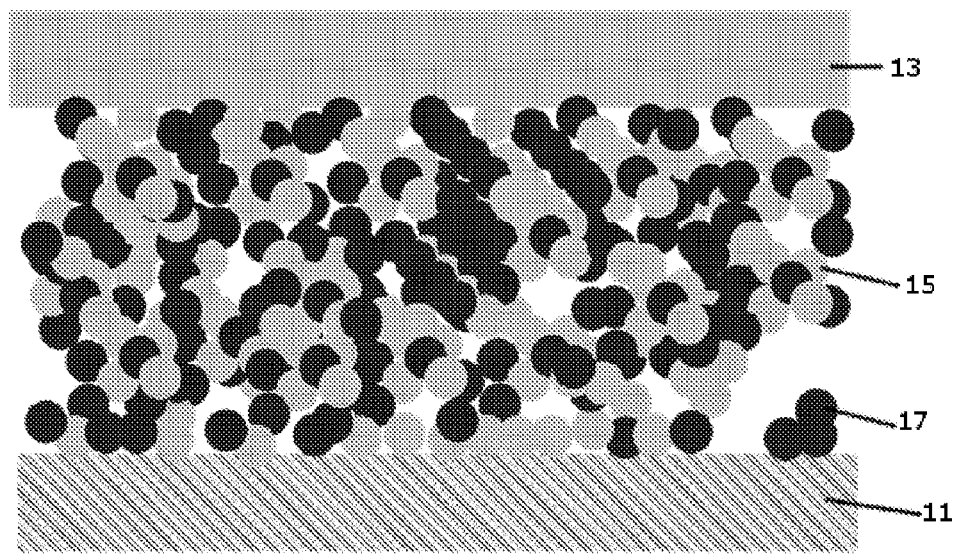
FIG. 5 shows a schematic representation of a conventional SOFC cermet anode for a metal supported SOFC.

A conventional SOFC anode for a metal-supported application, such as those disclosed in GB1315744.1 and GB1315746.6 is shown schematically in FIG. 5. Here the anode is deposited between the ferritic stainless steel substrate 11 and the gadolinium-doped ceria (CGO) electrolyte 13. The anode is porous to enable gaseous reactants to diffuse through it to/from the anode-electrolyte interface.

The anode consists of a sintered ceramic-metal composite of CGO 15 and metallic phases 17, where the particles making up the anode structure are typically in the size range 0.5-2 μm. Normally, the anode is deposited and sintered as a mixture of CGO and metal oxides, and the metal oxides are reduced to the active metal upon exposure to hydrogen during the first SOFC operation.

Anode Deposition Processes

For all the embodiments described here, the deposition process is essentially as described in GB1315746.6. As a first step, the impregnated PDC particles are formulated into an ink suitable for screen printing comprising: an organic solvent (Texanol); metal oxide(s) dispersed within the solvent system as pigments (nickel and cobalt oxides), typically in the range 50-80 wt % of the total ink mass; a polymer binder (e.g. Polyvinylbutyral (PVB) Eastman Butvar B76 grade); one or more dispersing agents (commercially available dispersants from Byk Chemie were used) to stabilise the metal oxide powders in the ink and minimise the tendency of the components to settle out or agglomerate; and a wetting/defoaming agent (Byk-057 made by Byk Chemie), to aid levelling of the printed layer and destabilise any bubbles trapped in the ink, which can lead to print defects.

Methods for dispersing the metal oxide(s) into the ink include those well known in the art for making inks and paints such as bead milling, use of a high-shear disperser and triple-roll milling, either singly or in combination. The resulting ink is screen printed onto a metal substrate to form a deposited anode layer which is then passed through an oven to evaporate off the solvent to form a dried printed layer.

The dried printed layer is passed through a furnace at a temperature high enough to burn off the binders and dispersant polymers in the ink. Isostatic or uniaxial pressing of the burnt-out layer is performed to increase its green density. The pressed layer is then placed in a furnace and fired it at a temperature of up to 1050° C. in air to cause the particles of metal oxide powder to sinter together to form a porous ceramic structure. Optionally the electrolyte layer may be printed over the anode in the process disclosed in PCT/GB2016/050256 and GB1502035.7, wherein the burnout, pressing and sintering steps combined.

Anode Consisting Entirely of Impregnated PDC Particles.

Figure 6:
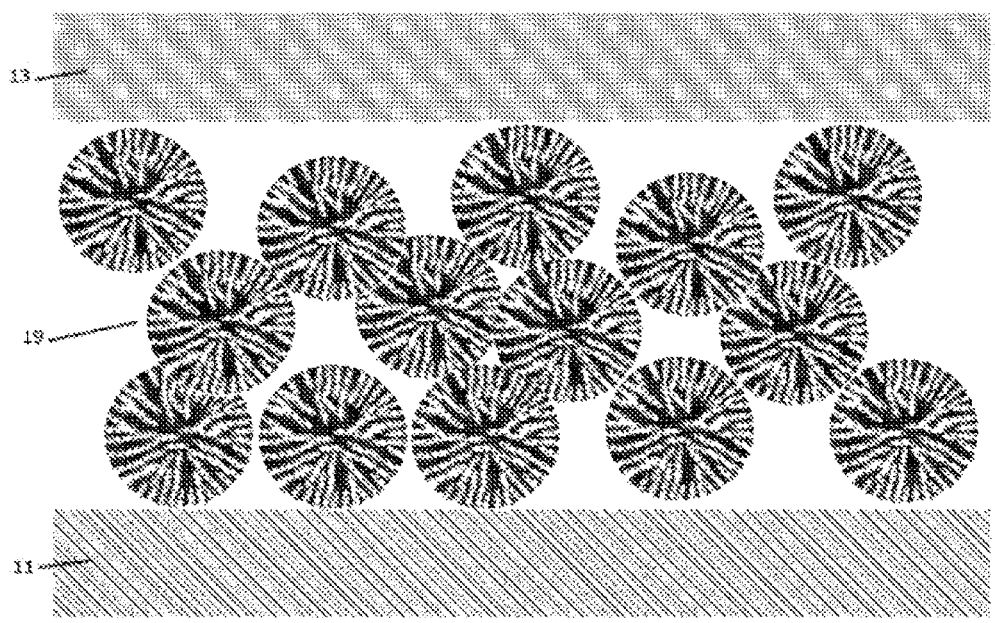
FIG. 6 shows a schematic representation of an anode of the invention comprising impregnated PDC particles.
Figure 7:
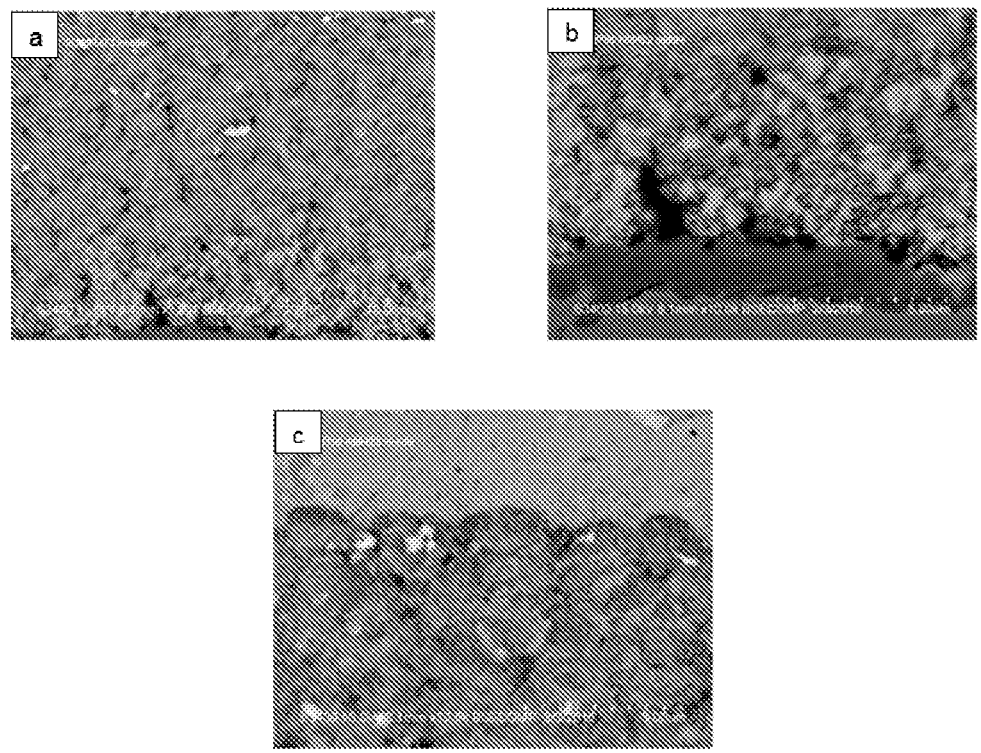
FIG. 7 shows SEM micrographs of cross sections of an SOFC cell with an anode made up of impregnated PDC showing (a) the anode microstructure, (b) the anode-substrate interface and (c) the anode-electrolyte interface.

One embodiment of the invention is shown schematically in FIG. 6, comprising an electrolyte 13, an anode made up of a sintered impregnated PDC particles 19 and the ferritic stainless steel substrate 11. The invention is shown in SEM micrographs of a cross-sectioned cell in FIG. 7. This has the advantage of very good REDOX stability and internal steam reforming activity relative to a conventional SOFC anode cermet because, without being bound by theory, it does not rely on the metallic phase for its mechanical stability.

The disadvantage of this embodiment is that the electronic conductivity of the anode layer is relatively low as there is no contiguous metallic phase to carry electronic current from the anode-electrolyte interface to the substrate. This results in a relatively high ohmic voltage loss in this part of the cell. To avoid this issue whilst maintaining the advantage of the invention, two other embodiments have also been developed.

Accordingly, active metal-impregnated PDC particles are typically incorporated into conventional cermet anode structures, partially replacing the metallic phase. In this instance the presence of some contiguous metallic phase results in a greatly enhanced electronic conductivity, at the expense of some REDOX stability and catalytic activity for internal steam reforming. However both of these properties are still enhanced by comparison with a conventional cermet anode.

Figure 8:
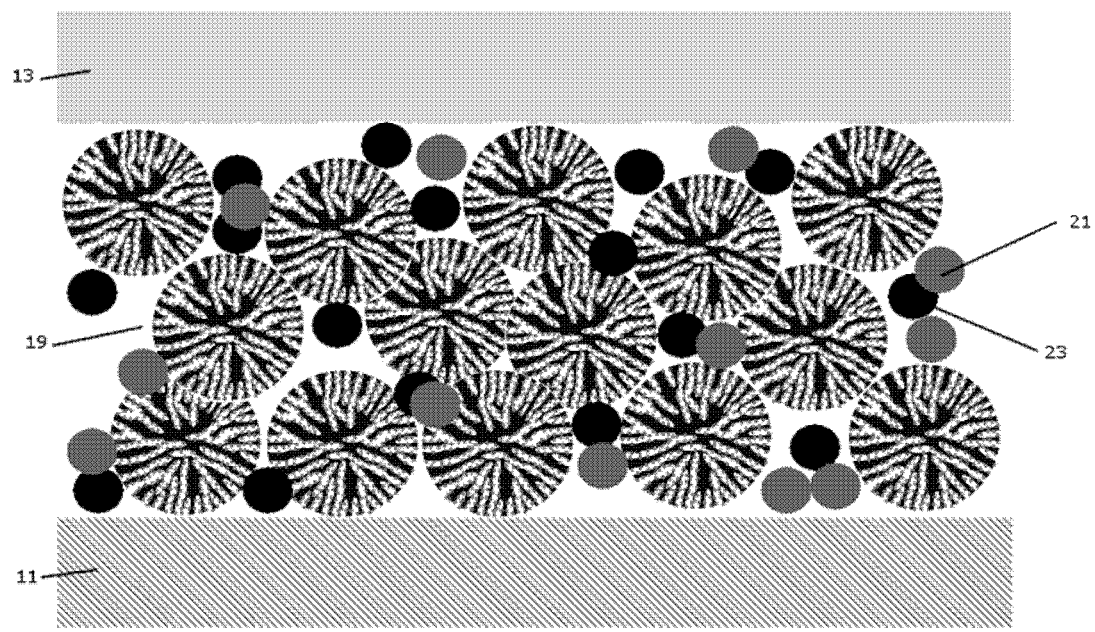
FIG. 8 shows a schematic representation of an SOFC anode where impregnated PDC particles are incorporated into a conventional cermet structure.
Figure 9:
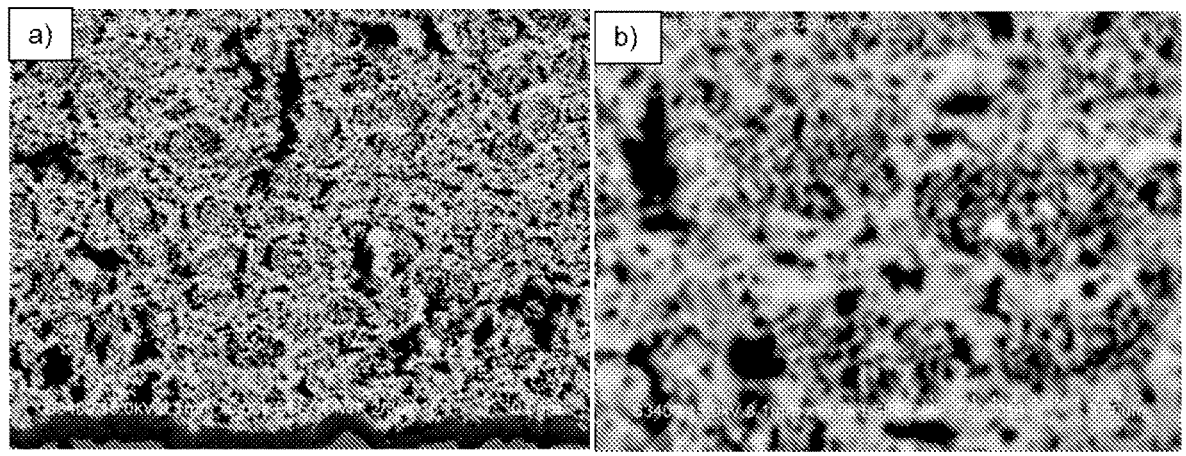
FIG. 9 shows SEM images of a cross section of an SOFC anode where impregnated PDC particles are incorporated into a conventional cermet structure at a) 5000× and b) 15000× magnification.

This structure is shown schematically in FIG. 8, showing the electrolyte 13, the steel substrate 11, and the anode comprising impregnated PDC particles 19, CGO particles 21 and metallic particles 23. An anode of this type is shown as an SEM cross section in FIG. 9.

A standard cermet anode contains 42 wt % CGO, and 58 wt % a 90:10 mixture of NiO and CuO upon initial manufacture. It has been shown that reducing the NiO/CuO content in these structures results in enhanced mechanical and REDOX stability, at the expense of electrochemical performance and internal steam reforming activity. It has been demonstrated that a desirable combination of high electrochemical performance, high REDOX stability and high internal reforming activity may be achieved by maintaining the 42 wt % CGO, but partially replacing the NiO/CuO content with impregnated PDC. The anode shown in FIG. 9 has the composition CGO 42 wt %, impregnated PDC 33 wt % and NiO/CuO 25 wt %. This results in an anode only containing around 28 wt % metal which has electrochemical performance comparable with a conventional cermet anode with 58 wt % metal. This reduction in metal content enhances the mechanical and REDOX stability of the anode.

Figure 10:
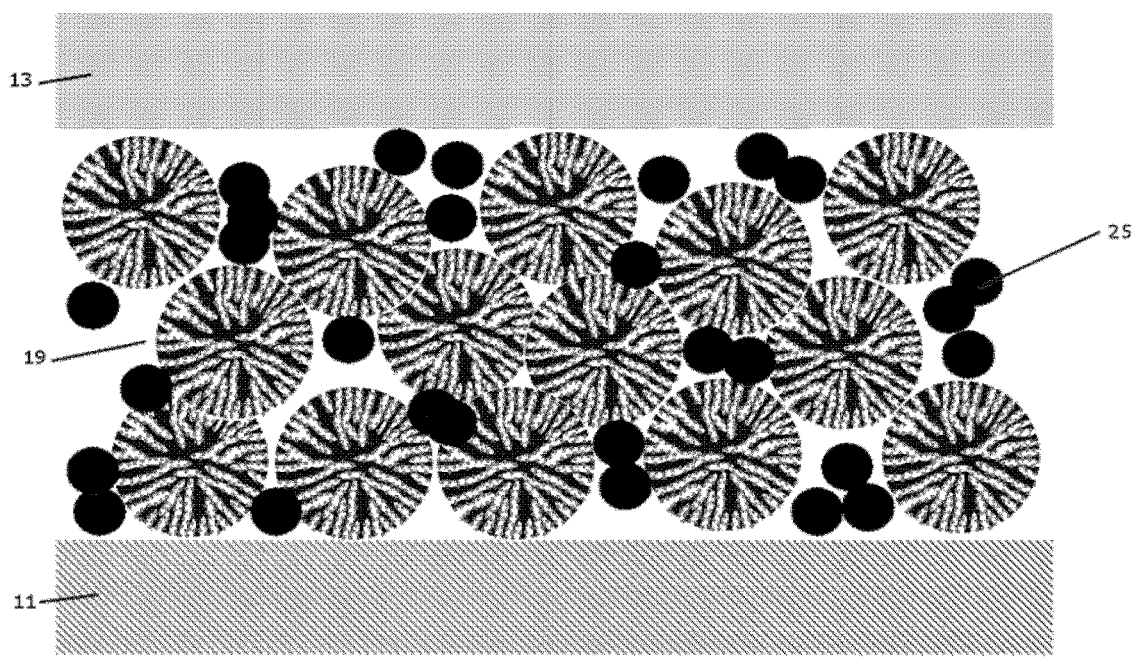
FIG. 10 shows a schematic representation of impregnated PDC particles incorporated into a matrix of $La_{0.75}Sr_{0.25}Mn_{0.5}Cr_{0.5}O_3$.
Figure 11:
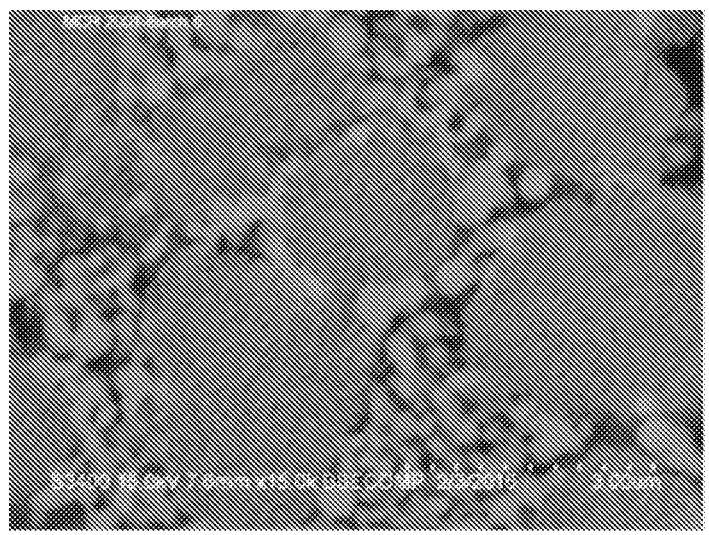
FIG. 11 shows SEM cross sectional images of PDC particles incorporated into a matrix of $La_{0.75}Sr_{0.25}Mn_{0.5}Cr_{0.5}O_3$.

Incorporation of Impregnated PDC Particles into a Matrix of Electronically Conductive Ceramic The active-metal impregnated PDC particles are typically incorporated into a matrix of a suitable electronically conductive ceramic. The porous conductive ceramic matrix provides the mechanical structure of the anode and provides a current collection path from the anode-electrolyte interface to the substrate. This is shown schematically in FIG. 10, showing the electrolyte 13, the impregnated PDC particles 19, the conductive ceramic 25 and the steel substrate 11. FIG. 11 shows an SEM cross section of PDC particles incorporated into a conductive ceramic matrix.

The choice of suitable electronically conductive ceramic is limited to materials which are stable and electronically conductive in a reducing atmosphere at SOFC operational temperatures. Suitable materials include the perovskites $La_{0.75}Sr_{0.25}CrO_3$ (lanthanum strontium chromite, LSCr) and $La_{0.75}Sr_{0.25}Mn_{0.5}Cr_{0.5}O_3$ (Lanthanum strontium chromium manganite, LSCrM). Of these two materials LSCrM is favoured due to its greater sinterability relative to LSCr. It will be noted that the relative ratios of lanthanum and strontium on the A-site of the perovskite, and chromium and manganese on the B-site may be varied significantly. Other suitable materials include the doped strontium titanates. This has been found to be advantageous of demonstrating very high REDOX stability as the mechanical structure of the anode is made of fully REDOX stable ceramic.

Table 1 shows a summary of testing data for the above described systems, and a comparison with standard anode cermets. The PDC was impregnated with 8 wt % nickel and 2 wt % cobalt, the cobalt being added to enhance sintering of the layer. SOFC power at 570° C. and 0.75V/cell is measured in 56% $H_2$/44% $N_2$ fuel. It can be seen that the power output of Embodiment 2 is comparable with the standard anode, with somewhat lower power in the case of Embodiment 1 due to higher ohmic resistance in the anode as described previously.

The overall and internal methane conversions are a measure of the catalytic activity of the anode for internal methane steam reforming. This is measured with a stack temperature of 610° C., with the stack being operated on partially steam reformed methane with a thermodynamic equilibrium temperature of 540° C., with a stack fuel utilisation of 65%. The overall methane conversion is the methane conversion between the reformer feed and the stack fuel outlet. The internal methane conversion is the percentage of the methane in the stack fuel feed converted within the stack. The reformate equilibrium of 540° C. means that 55% of the methane fed to the system is converted externally, with the remainder converted within the stack. The fuel feed composition for these measurements are shown in Table 2. The methane conversion is calculated based on a measurement of the fuel gas composition leaving the stack using an infra-red gas analyser.

TABLE 1

Summary of performance testing metrics

| Variant | CGO/ wt % | PDC/ wt % | NiO/CuO/ wt % | Mean cell power at 570° C., 0.75 V/W | REDOX stability | Overall methane conversion/% | Internal methane conversion/% |
|---|---|---|---|---|---|---|---|
| Embodiment 1 | 0 | 100 | 0 | 17.45 | >180 cycles | 93 | 84 |
| Embodiment 2 | 42 | 33 | 25 | 20.54 | >200 cycles 0.3% overall performance change | 93 | 84 |
| Standard anode cermet | 44 | 0 | 56 | 21.45 | >200 cycles 1% overall performance change | 91 | 80 |

TABLE 2

Fuel gas composition for internal methane conversion measurements.

| Gas | Mole % in stack gas feed |
|---|---|
| Hydrogen | 42.3 |
| Steam | 35.6 |
| Carbon monoxide | 2.7 |
| Carbon dioxide | 8.6 |
| Methane | 10.9 |

It can be seen from Table 1 that embodiment 2 in particular offers advantages over the standard anode in terms of reduced performance loss through REDOX cycling and enhanced internal methane reforming.

Although features described herein may be referred to as "comprising" part of the invention, it is also envisaged that the invention may "consist" or "consist essentially" of one or more of said features. Further, all numerical ranges are not to be interpreted literally but as being modified by the term "about" to encompass those values deviating in a literal but non-technically material manner.

The invention claimed is:

1. An anode for a solid oxide fuel cell (SOFC), the anode comprising:
    a matrix comprising a doped metal oxide; and
    an electrocatalyst,
    wherein the electrocatalyst comprises porous particles supported by the matrix, the porous particles having pore sizes greater than 1 nm and containing a steam reformation catalyst material trapped within the pores of the porous particles.

2. An anode according to claim 1, wherein the steam reformation catalyst material is selected from: Fe, Co, Ru, Ni, Rh, Pt, Pd, or a combination thereof; and optionally wherein the steam reformation catalyst material is selected from: Fe, Co, Ni, or a combination thereof.

3. An anode according to claim 1, wherein the steam reformation catalyst material is nickel.

4. An anode according to claim 1, wherein the doped metal oxide is an electrically conducting ceramic material selected from the perovskites lanthanum strontium chromite (LSCr), lanthanum strontium chromite manganite (LSGM), and doped strontium titanates.

5. An anode according to claim 1, wherein the doped metal oxide is an electrically conducting ceramic material.

6. An anode according to claim 1, wherein the doped metal oxide is a rare-earth doped ceria, optionally selected from: gadolinium doped ceria (CGO); samarium doped ceria; or combinations thereof.

7. An anode according to claim 1, wherein the porous particles containing the steam reformation catalyst material are present in the range 5 to 70% wt. based on the weight of the total anode.

8. An anode according to claim 1, wherein the porous particles containing the steam reformation catalyst material are present in the range 10 to 60% wt. based on the weight of the total anode.

9. An anode according to claim 1, wherein the porous particles have pore sizes of less than 1 μm.

10. An anode according to claim 1, wherein the matrix surrounds the porous particles.

11. An anode according to claim 1, wherein the porous particles have pore sizes in the range 1 nm to 500 nm.

12. An anode according to claim 1, wherein the porous particles are mesoporous particles.

13. An anode according to claim 1, wherein the porous particles are dispersed throughout the matrix.

14. An anode according to claim 1, wherein the porous particles comprise praseodymium doped ceria (PDC).

15. An anode according to claim 1, wherein the porous particles comprise a rare-earth doped ceria.

16. An anode according to claim 1, wherein the matrix further comprises in the range 5%-70% wt. of the steam reformation catalyst material, optionally selected from nickel and nickel oxide.

17. An anode according to claim 1, wherein the anode is for a metal supported solid oxide fuel cell, and is provided on a metal support substrate.

18. A composition for making an anode for a solid oxide fuel cell, the composition comprising:
 a matrix precursor comprising a doped metal oxide; and
 an electrocatalyst,
 wherein the electrocatalyst comprises porous particles having pore sizes greater than 1 nm and containing the steam reformation catalyst material trapped within the pores of the porous particles.

19. A method of making an anode for a solid oxide fuel cell, comprising the steps of:
 i) applying a composition according to claim 18 to a substrate; and
 ii) sintering the composition.

20. A solid oxide fuel cell comprising the anode according to claim 1, and optionally, wherein the anode is for a metal supported solid oxide fuel cell, and is provided on a metal support substrate.

21. An anode according to claim 1, wherein the porous particles are of higher porosity than the matrix.

22. An anode according to claim 1, wherein the surface of the pores of the porous particles are coated with active metal catalyst nanoparticles.

23. An anode according to claim 1, wherein the steam reformation catalyst material in the porous particles comprises nickel.

* * * * *